United States Patent [19]

Kobayashi et al.

[11] Patent Number: 4,661,158

[45] Date of Patent: Apr. 28, 1987

[54] RECORDING LIQUID

[75] Inventors: Masatsune Kobayashi; Tsuyoshi Eida; Shoji Koike, all of Yokohama; Keiko Nakousai, Inagi, all of Japan

[73] Assignee: Canon Kabushiki Kaisha, Tokyo, Japan

[21] Appl. No.: 732,635

[22] Filed: May 10, 1985

[30] Foreign Application Priority Data

May 17, 1984 [JP] Japan .................. 59-97537

[51] Int. Cl.$^4$ ............................ C09D 11/00
[52] U.S. Cl. ............................ 106/22; 106/20
[58] Field of Search ............... 346/78 R, 140 R, 1.1; 106/20, 22, 23

[56] References Cited

U.S. PATENT DOCUMENTS

| 4,295,889 | 10/1982 | Eida et al. | 106/22 |
| 4,426,226 | 1/1984 | Ohta et al. | 106/22 |
| 4,533,923 | 8/1985 | Suzuki | 106/22 |

Primary Examiner—Paul Lieberman
Assistant Examiner—John F. McNally
Attorney, Agent, or Firm—Fitzpatrick, Cella, Harper & Scinto

[57] ABSTRACT

A recording liquid mainly comprises a recording agent as an image-forming component and a liquid medium containing at least water and a glycol for dissolving or dispersing the recording agent, characterized in that the recording agent contains at least one of dyes represented by the following general formula (A):

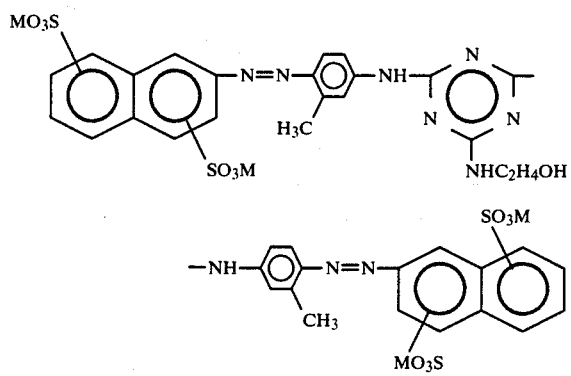

wherein M represents one element selected from H, Na, Li and K, and 55 mole % or more of total M given in the general formula (A) is Na, Li or K. The recording liquid may additionally contain a water-soluble organic solvent.

14 Claims, No Drawings

RECORDING LIQUID

BACKGROUND OF THE INVENTION

1. Field of the Invention

This invention relates to a novel recording liquid for use in recording with an ink, and particularly to a recording liquid suitable for a recording system comprising discharging a recording liquid from a fine discharge outlet (discharge orifice) provided on a recording head and throwing the recording liquid as droplets, thereby carrying out recording without any clogging in the recording means.

2. Description of the Prior Art

The conventional writing implements (fountain pens, felt pens, etc.) as recording means for recording on a material to be recorded, such as paper and the like, use solutions of various dyes in water or organic solvents as an ink.

Even the so called ink jet recording system, according to which recording is carried out by discharging a liquid from a recording head through a discharge orifice by oscillation of a piezooscillator or by an electrostatic attraction caused by application of a high voltage, uses solutions of various dyes in water or an organic solvent. However, the recording liquid for the ink jet recording has more stringent requirements for so many characteristics than those for inks for the ordinary writing implements such as fountain pens and felt pens.

The ink jet recording is to throw droplets of a recording liquid, the so called "ink", for their deposition on a material to be recorded and to carry out recording. Such a recording liquid comprises a recording agent (for which a dye or a pigment is used) and a liquid medium for dissolving or dispersing the recording agent (for which water or various organic solvents or their mixtures are used) as basic components, and, if necessary, can further contain various additives.

So far known recording liquids are solutions or dispersions of various dyes or pigments in an aqueous or non-aqueous solvent, as disclosed, for example, in Japanese Patent Publications Nos. 8361/1975 40484/1976, 13126/1977 and 13127/1977 and Japanese Laid-Open Patent Application No. 95008/1975.

Desirable requirements for these recording liquids are that (1) they must have liquid physical properties (viscosity, surface tension, electroconductivity, etc.) which are matched to the discharge conditions (driving voltage for piezoelectric members, driving frequency, shape of orifice and quality of material of the orifice, orifice diameter, etc.), (2) they must be stable and must undergo no clogging even when they are stored for a long time, (3) they must have a rapid fixing and smooth dot peripheries and less bleeding, (4) the printed image must have a clear color tone and a high density, (5) the printed image must have a good water resistance and a good light fastness, (6) they must not attack the surrounding members (containers, joint tubes, seal materials etc.), and (7) they must have an excellent safety against a bad smell, toxicity, inflammability, etc.

It is quite difficult to satisfy the said requirements at the same time, and it can be said that the said prior art is not satisfactory for this reason.

A recording liquid applicable to the said desired recording basically comprises a dye and its solvent, as described above, and thus the characteristics of the recording liquid greatly depend on the properties specific to the components used as a dye and a liquid medium. Accordingly, it is a very important technique in the relevant technical field to select a dye and a liquid medium so that the recording liquid can satisfy the said requirements. Above all, there has been no known recording liquid, based on a yellow dye, which can fully satisfy the said requirements.

To increase an effect of preventing clogging at a recording liquid discharge outlet due to deposition of inorganic salts, a stability of the recording liquid, and an effect of preventing corrosion of metal constitution members in writing implements, inorganic salts such as NaCl, $Na_2SO_4$, and the like, and ions such as $Ca^{++}$ and the like are removed from a dye, for example, to 5% or less by weight of NaCl and 1% or less by weight of $Na_2SO_4$, by ultrafiltration, ion exchange resin treatment, or organic solvent treatment, or together with salting out or acid deposition treatment. However, when such treatments are applied to a yellow dye, typical of which are C.I. Direct Yellow-86 and its derivatives, the chemical and physical characteristics of the dye itself are inevitably changed, and it has been found that the stability and long time storage property of a recording liquid containing such a dye are considerably deteriorated with a failure to obtain the desired effects.

The structure of a yellow dye, typical of which are C.I. Direct Yellow-86 and its derivative, as herein referred to, includes the following structural formula (B) registered as C.I. Direct Yellow-86 in Color Index, the following general structural formula (A) covering the formula (B), and structures covering those having $-SO_3Li$ or $-SO_3K$ in place of $-SO_3Na$ in the structural formulae (A) or (B).

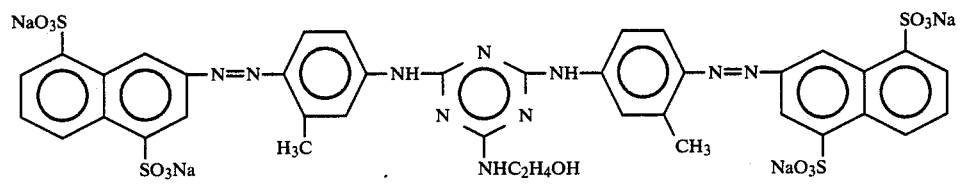

(B)

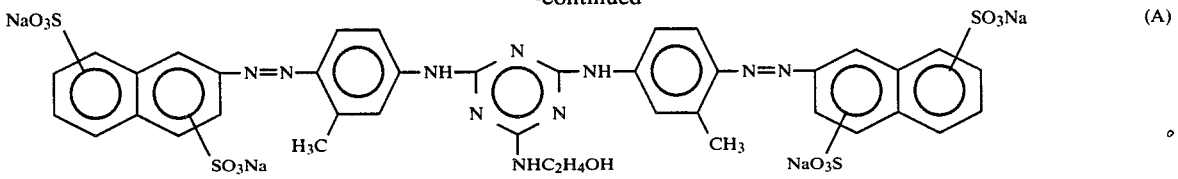

Relevant phenomena as problems will be described in detail below.

Water or mixture of water with various water-soluble organic solvents have been so far used as a liquid media for the recording liquid, and preferable liquid media which can form a recording liquid satisfying all the said requirements for a recording liquid fairly well include mixtures of water with a glycol such as ethyleneglycol, diethyleneglycol, and the like. The phenomena as problems seem to be due to a considerable decrease in the solubility of the Yellow dye in such liquid media after the said treatment.

As a result of extensive studies, the present invention has been established by finding dyes suitable for the desired recording liquid, which have a excellent solubility in liquid media comprising a mixture of water with a glycol and have less contents of inorganic salts causing clogging, etc.

It has been known that the dye of structural formula (A) has several distinguished basic characteristics such as a clear color phase, a good light fastness, a high water resistance, and the like, and also has disadvantages in the solubility in the liquid media and the preservability of the resulting recording liquid, and has not been fully utilized practically yet. These problems have been completely solved in the present invention.

SUMMARY OF THE INVENTION

An object of the present invention is to provide a recording liquid which has physical properties such as viscosity, surface tension, and the like falling within appropriate ranges and can provide a recording image with a sufficiently high density without any clogging at a recording liquid discharge outlet, for example, the pen edge of a fountain pen or the minute orifice in an ink jet recording apparatus.

Another object of the present invention is to provide a recording liquid which undergoes no change in physical properties or no deposition of solid matters while stored for a long time.

A further object of the present invention is to provide a recording liquid which can carry out recording on various members without any restriction to the kind and type of materials to be recorded.

Still another object of the present invention is to provide a recording liquid which has a high fixing speed and can provide an image having a high water resistance, a good light fastness, a high wear resistance and a high resolution.

According to the present invention, there is provided a recording liquid which mainly comprises a recording agent as an image-forming component and a liquid medium containing at least water and a glycol for dissolving or dispersing the recording agent, Characterized in that the recording agent contains at least one of dyes represented by the following general formula (A):

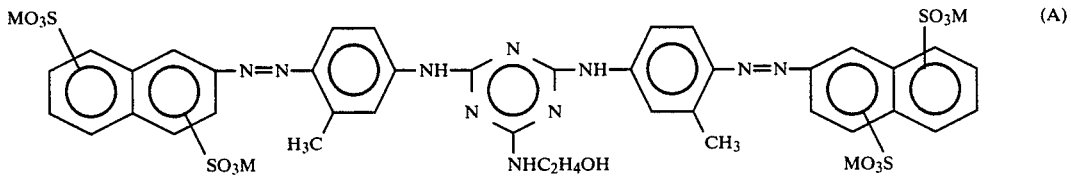

wherein M represents one element selected from H, Na, Li and K, and at least 55 mole % or more of total M defined in the general formula (A) is Na, Li or K. A water-soluble organic solvent may be added.

DESCRIPTION OF THE PREFERRED EMBODIMENTS

It is preferable that the liquid medium for the present recording liquid contains 80% or less by weight of water on the basis of the liquid medium.

The present recording liquid comprises at least one of dyes represented by the said general formula (A) as a recording agent component and a liquid medium containing water and a glycol particularly effective for preventing clogging.

The glycol for use in the liquid medium for the present recording liquid includes polyalkyleneglycols such as polyethyleneglycol, polypropyleneglycol, and the like; alkyleneglycols whose alkylene group has 2 to 6 carbon atoms, such as ethyleneglycol, propyleneglycol, butyleneglycol, triethyleneglycol, 1,2,6-hexanetriol, thiodiglycol, hexyleneglycol, diethyleneglycol, and the like; glycerol; and lower alkyl ethers of polyhydric alcohols such as ethyleneglycol methyl ether, diethyleneglycol methyl (or ethyl) ether, triethyleneglycol monomethyl (or ethyl) ether, and the like, and at least one or more of these glycols can be used as a liquid medium component.

The content of the glycol in the recording liquid is generally 10 to 70% by weight, preferably 20 to 60% by weight, more preferably 25 to 40% by weight, on the basis of total weight of the recording liquid.

Besides the glycol as a liquid medium component, the present recording liquid can contain a water-soluble organic solvent for improving the characteristics of the recording liquid, if necessary. The water-soluble organic solvent includes alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol, isobutyl alcohol, and the like; amides such as dimethyl formamide, dimethyl acetamide, and the like; ketones or ketone alcohols such as acetone, diacetone alcohol, and the like; ethers such as tetrahydrofuran, dioxiane, and the like; nitrogen-containing heterocyclic ketones such as N-methyl-2-pyrrolidone, 1,3-dimethyl-2-imidazolidinone, and the like. At least one of the water-soluble organic solvents can be contained.

The content of the water-soluble organic solvent and the glycol in the present recording liquid is generally 10 to 70% by weight, preferably 20 to 60% by weight, more preferably 30 to 55% by weight on the basis of total weight of the recording liquid.

The content of water in the present recording liquid depends on the kind and composition of the solvent component and the desired characteristics of a recording liquid, and can be selected in a broad range, and is generally 30 to 90% by weight, preferably 40 to 80% by weight, more preferably 45 to 80% by weight on the basis of total weight of a recording liquid.

The dye for use in the present recording liquid is at least one of the dyes represented by the said general formula (A), and has a good solubility particularly in a liquid medium having the composition as described above comprising water and a glycol.

Generally, the solubility of the dyes represented by the said general formula (A) particularly in water contained as a liquid medium component greatly depends on a proportion of Na, Li or K to total M of the dyes. Thus, it is desirable that at least 55 mole % or more of total M of the dyes for use in the present recording liquid as a liquid medium having the said composition is Na, Li or K.

The dye for the present recording liquid can be prepared from C.I. Direct Yellow-86 and its derivatives as a starting material. That is, inorganic components such as NaCl, Na$_2$SO$_4$, LiOH, KOH, calcium ions, and the like are removed from yellow dyes including C.I. Direct Yellow-86 and its derivatives by ultrafiltration, ion exchange resin treatment, or treatment by various organic solvents, or together with salting out acid deposition treatment, and then the content of Na, Li or K as the desired element in the dye molecules is determined according to various analytical procedures. Then, a proportion of the desired element such as Na, Li or K to the total M is adjusted to a desired value, for example, by adding NaOH, LiOH or KOH to the aqueous dye solution according to the desired object, thereby forming a salt or making up for the short element. In this manner, the dye for the present recording liquid can be prepared.

For example, in the case of a dye having the said structural formula (B), the solid dye obtained by the said treatment has such low inorganic salt contents as 1% or less by weight of NaCl, 0.5% or less by weight of Na$_2$SO$_4$, and 50 ppm or less of Ca$^{++}$ ions, and the present recording liquid containing the said dye has an excellent stability without any clogging at the recording liquid discharge outlet due to the deposition of inorganic salts, and is a suitable recording liquid particularly from the viewpoint of corrosion prevention of metallic constitution members of writing implements.

In the present invention, the proportion of desired element such as Na, Li or K to the total M is determined by the following manner. For example, in the case of Na, the total Na contained in the dye after the inorganic component (inorganic salt) removal treatment is quantitatively determined, and then the Na in the form of free inorganic salts contained in the dye, that is, the Na not combined with the dye compound is quantitatively determined by quantitatively determining Cl$^-$ and SO$_4^-$ through ion chromatography, because the Na is almost all in the forms of NaCl and Na$_2$SO$_4$, and calculating the amount of Na present as inorganic salts from the amounts of Cl$^-$ and SO$_4^-$. By subtracting the amount of Na present as inorganic salts from the total Na amount obtained, the amount of Na combined with the dye compound can be approximately calculated. Ultimately, the proportion of Na to the total M is determined from the total M amount calculated from the moles of the dye used for the quantitative determination (it is seen from the structural formula that one dye molecule contains 4 Ms) and the amount of Na combined with the dye compound.

The content of the dye represented by the general formula (A) in the present recording liquid is selected in view of the kind of liquid medium, characteristics required for the recording liquid, etc. and is generally 0.05 to 10% by weight, preferably 0.05 to 6% by weight, more preferably 0.05 to 4% by weight based on the total weight of the recording liquid. The dye can be used alone or in combination of at least two thereof, or in combination with other direct dye or acid dye.

The present recording liquid prepared from these components is not only well balanced and distinguished in the fixability to materials to be recorded, or light fastness, weathering resistance, water resistance, etc. of the recording image, when used as a recording liquid for writing implements such as fountain pens, ball point pens using a water-soluble ink, felt pens, and the like, but also distinguished in solubility of the dye in the liquid medium and stability superior or comparable to that of the conventional recording liquid, without any deposition of the dye at the recording liquid discharge outlet such as pen edge, and the like after being left unused for a long time and without the resulting clogging. When used in the ink jet recording, the present recording liquid is also well balanced and distinguished in recording characteristics (signal responsing property, stability in droplet formation, discharge stability, continuous recordability for a long time, and discharge stability after a long rest time of recording operation), storage stability, fixability to materials to be recorded, or light fastness, weathering resistance, water resistance, etc. of the recording image, and is particularly distinguished in the stability and the storage stability for a long time, among them, showing distinguished superiority in the prevention of clogging at the discharge orifice to the conventional recording liquid.

To further improve the characteristics, the present recording liquid can further contain various known additivies, for example, a viscosity-controlling agent such as polyvinyl alcohol, celluloses, water-soluble resins, and the like; various cationic, anionic and nonionic surfactants; surface tension-controlling agents such as diethanolamine, triethanolamine, and the like; pH-controlling agent using a buffer solution; antifungal substance, etc.

When the present recording liquid is applied to an ink jet system of such a type as to discharge a recording liquid under the action of heat energy, thermal properties, for example, specific heat, coefficient of thermal expansion, thermal conductivity, etc. may be controlled.

The recording liquid obtained according to the present invention has physical properties such as viscosity, surface tension, and the like falling within appopriate ranges, can provide a recording image with a sufficiently high density without any clogging at a recording liquid discharge outlet such as the pen edge of a fountain pen or the minute orifice in an ink jet recording apparatus and the like, undergoes no change in physical properties or no deposition of solid matters while stored for a long time, and can carry out recording on various members without any restriction to the kind and type of materials to be recorded. Further, the recording liquid has a high fixing speed and can provide an image having a high water resistance, a good light fastness, a high wear resistance and a high resolution.

EXAMPLES 1-5

At first, 200 g of commercially available dye, Kayaku Direct Yellow R Special (C.I. Direct Yellow-86), made by Nihon Kayaku K.K., Japan, was stirred in 4 l of an aqueous saturated sodium sulfate solution for one hour to effect salting out, and then the mixture was filtered. The precipitate was dried to obtain dried product I.

Then, 30 g of dried product I was stirred in 300 cc of methyl cellosolve for one hour and dissolved. The solution was filtered, and the filtrate was concentrated to dryness to obtain dried product II.

Then, 10 g of dried product II was dissolved in 150 cc of deionized water, and then the solution is added to 800 cc of isopropyl alcohol. The mixture was stirred for 30 minutes and filtered. The filtrate was concentrated to dryness to obtain dried product III. The proportion of Na in total M contained in the dye of dried product III was determined according to the said procedure, and found to be 41 mole % by calculation.

Then, 10 g of dried product III was weighed out, and 5 solutions each of dried product III in 500 cc of deionized water were prepared, and predetermined amounts of aqueous 1N NaOH solution as shown in Table 1 were added thereto, correspondingly and the solutions were stirred for 4 hours. Then, the solutions were concentrated to dryness and pulverized to obtain dyes Nos. 1-5. The proportion of Na in total Na in the dyes is shown in Table 1.

TABLE 1

| Dye No. | Aqueous 1N NaOH solution added (cc) | Proportion of Na in total M in dye as determined by mole % |
| --- | --- | --- |
| 1 | 3.5 | 55 |
| 2 | 4.5 | 60 |
| 3 | 6.7 | 70 |
| 4 | 9.0 | 80 |
| 5 | 13.2 | 100 |

The individual dyes of Table 1 were added to liquid media having the following composition such that the concentration of the individual dyes becomes 3% by weight in the recording liquids, and thoroughly mixed to form solutions. Then, the individual solutions were filtered through a Teflon filter having the pore size of 1 $\mu$m under pressure, and then the filtrates were deaerated by a vacuum pump to make recording solutions.

[Liquid medium composition]
Deionized water (which will be hereinafter referred to merely as water): 60 parts by weight
Diethyleneglycol: 40 parts by weight The thus obtained 5 kinds of recording liquids were subjected to ink jet recording by a recording apparatus having an on-demand type recording head (discharge orifice diameter: 50 $\mu$m, piezooscillator driving voltage: 60 V, frequency: 4 KHz) for discharging a recording liquid by a piezooscillator, and the following items, which had been problems in the conventional recording liquid, were investigated. The results are shown in Table 2.

($T_1$) Storage stability of recording liquid for a long time:

Recording liquids were placed into a glass container, tightly sealed and stored at $-30°$ C. and $60°$ C. for 6 months, and the test was carried out to evaluate whether deposition of insoluble matters was observable or not. The case that no deposition was observed was marked as "o", and the case that deposition was observed as "x".

($T_2$) Discharge stability:

Recording liquids were continuously discharged in two atmospheres at $5°$ C. and $40°$ C., respectively, for 24 hours.

The case that constantly stable and high quality recording could be carried out in these two atmospheres was marked as "o", the case that it failed as "x", and the intermediate case as "Δ".

($T_3$) Discharge responsing property

The recording apparatus was operated after being left unoperated for 3 months to investigate a discharge state of intermittent discharging for every interval of two seconds. The second case that the same stable and uniform discharge state as before being left unoperated could be obtained even after being left unoperated was marked as "⊚", the case that the same stable and uniform discharge state as before being left unoperated was obtained a few seconds after the initial period of operation after being left unoperated, though some disturbance was observed in discharging in the initial period as "o", and the case that no same stable and uniform discharge state as before being left unoperated was obtained when operated after being left unoperated as "x".

($T_4$) Orifice clogging:

After the recording apparatus was left unoperated for 3 months, the orifice tip end was inspected by a microscope. The case that no clogging was observed was marked as "o", the case that some clogging was observed as "Δ", and the case that the voltage was completely clogged as "x".

($T_5$) Recording image quality:

The case that the recorded image was clear with a high density, the percent density decrease after being exposed to an indoor light for 3 months was 1% or less, and the bleeding of the image when immersed in water for one minute was very small was marked as "o", and the case that the recorded image was not clear with a high density, or the image was clear but the percent density decrease when exposed to an indoor light for 3 months exceeded 1%, and the bleeding of image when immersed in water for one minute was remarkable as "x".

($T_6$) Fixability to various materials to be recorded:

The following materials to be recorded were subjected to recording with the individual recording liquids, and, 15 seconds after the recording, the recorded parts were rubbed with a finger to investigate occurrences of image blurring and bleeding. The case that good fixability without any image blurring, bleeding, etc. was obtained was marked as "o", and the case that image blurring, bleeding, etc. were observed as "x".

| Name of material to be recorded | Type | Supplier |
|---|---|---|
| G in Kan | Wood free paper (High class) | Sanyo Kokusaku Pulp Co., Ltd. |
| Seven-star | Wood free paper (High class) | Hokuetsu Seishi Co., Ltd. |
| Shirobotan | Middle class | Honshu Seishi Co., Ltd. |
| Toyo Roshi No. 4 | Non-sized paper | Toyo Roshi Co., Ltd. |

COMPARATIVE EXAMPLE 1

Ink jet recording was carried out in the same manner as in Example 1, except that the dried product III (with the proportion of Na in total M in the dye of 41 mole %), as obtained in Example 1, was used as a recording agent component, and each of items ($T_1$) to ($T_6$) was investigated. The evaluation results are shown in Table 2.

COMPARATIVE EXAMPLE 2

10 g of the dried product III, as obtained in Example 1, was dissolved in 500 cc of deionized water, and 3.2 cc of an aqueous 1N NaOH solution was added thereto. The solution was stirred for 4 hours, and concentrated to dryness, and pulverized, whereby a dye with a proportion of Na to total M in the dye of 54 mole % was obtained.

A recording liquid was prepared in the same manner as in Example 1, using the thus prepared dye as a recording agent component, and subjected to ink jet recording in the same manner as in Example 1 to investigate each of items ($T_1$) to ($T_6$) subjected to ink jet recording in the same manner as in Example 1 to investigate each of items ($T_1$) to ($T_6$). The evaluation results are shown in Table 2.

TABLE 2

| | Dye No. | $T_1$ | $T_2$ | $T_3$ | $T_4$ | $T_5$ | $T_6$ |
|---|---|---|---|---|---|---|---|
| Example 1 | 1 | o | o | ⊚ | o | o | o |
| Example 2 | 2 | o | o | ⊚ | o | o | o |
| Example 3 | 3 | o | o | ⊚ | o | o | o |
| Example 4 | 4 | o | o | ⊚ | o | o | o |
| Example 5 | 5 | o | o | ⊚ | o | o | o |
| Comp. Ex. 1 | — | x | x | x | x | o | o |
| Comp. Ex. 2 | — | x | Δ | o | Δ | o | o |

EXAMPLE 6–10

5 kinds of recording liquids were prepared in the same manner as in Examples 1 to 5, using a liquid medium of the following composition and the individual dyes as used in Examples 1 to 5.
   Water: 60 parts by weight
   Polyethyleneglycol (molecular weight: 300): 15 parts by weight
   Diethyleneglycol: 15 parts by weight
   N-methyl-2-pyrrolidone: 15 parts by weight The thus obtained 5 kinds of the recording liquids were each subjected to ink jet recording in the same manner as in Examples 1 to 5 to investigate each of items ($T_1$) to ($T_6$). The evaluation results are shown in Table 3.

COMPARATIVE EXAMPLE 3

A recording liquid was prepared in the same manner as in Example 6, except that the dried product III (with the proportion of Na in total M in the dye of 41% by mode), as obtained in Example 1, was used as a recording agent component, and subjected to ink jet recording in the same manner as in Example 6 to investigate each of items ($T_1$) to ($T_6$). The evaluation results are shown in Table 3.

COMPARATIVE EXAMPLE 4

A recording liquid was prepared in the same manner as in Example 6, except that the dye with the proportion of Na in total M in the dye of 54 mole %, as formed in Comparative Example 2 was used as a recording agent component, and subjected to ink jet recording in the same manner as in Example 1 to investigate each of items ($T_1$) to ($T_6$). The evaluation results are shown in Table 3.

TABLE 3

| | Dye No. | $T_1$ | $T_2$ | $T_3$ | $T_4$ | $T_5$ | $T_6$ |
|---|---|---|---|---|---|---|---|
| Example 6 | 1 | o | o | ⊚ | o | o | o |
| Example 7 | 2 | o | o | ⊚ | o | o | o |
| Example 8 | 3 | o | o | ⊚ | o | o | o |
| Example 9 | 4 | o | o | ⊚ | o | o | o |
| Example 10 | 5 | o | o | ⊚ | o | o | o |
| Comp. Ex. 3 | — | x | Δ | x | Δ | o | o |
| Comp. Ex. 4 | — | x | o | x | o | o | o |

EXAMPLES 11–20

Each of the recording liquids prepared in Examples 1 to 10 were filled in individual felt pens and letters were written on middle class paper (Shiro botan, made by Honshu Seishi Co., Ltd.) with these felt pens to investigate the water resistance of recorded letters and the writing property of felt pens after being left unused for 24 hours with their caps off.

In the recording liquids used in the present Examples, all the recorded letters had a good water resistance, and had a good recording property, since no deposition of dye, etc. was observed at the pen edges even after being left unused for 24 hours. Examples 21–25.

An aqueous solution containing 400 g of commercially available dye Kayaku Direct Yellow R Special (C.I. Direct Yellow-86), made by Nihon Kayaku K.K., Japan, in 8 l of water was prepared and admixed with hydrochloric acid with stirring until precipitates were thoroughly formed (acid deposition treatment).

Then, the resulting precipitates were recovered by filtration, thoroughly washed with water, and dried, whereby a dried product was obtained. The dried product was analyzed by an atomic absorption spectrophotometer to make sure whether no Na was contained or Na was negligibly contained, or not. Then, 10 g each of the said dried product was weighed out into 6 beakers. Samples in the beakers were identified as Samples I, II, III, IV, V and VI, correspondingly. Aqueous lithium hydroxide solutions were added to the corresponding samples with stirring, where the individual aqueous lithium hydroxide solutions were the ones prepared by dissolving the predetermined amounts of lithium hydroxide each in 200 g of water, for example, 0.31 g of lithium hydroxide was made to be contained in Sample I, 0.22 g in Sample II, 0.20 g in Sample III, 0.18 g in Sample IV, 0.15 g in Sample V, and 0.12 g in Sample VI. Then, these aqueous solutions of Samples I to VI were throughly stirred, concentrated to dryness, and pulverized, whereby six kinds of dyes Nos. 6 to 11 were obtained. These dyes Nos. 6 to 11 were analyzed by an atomic absorption spectrometer to determine the Li content. Proportion of Li to total M in the dye structure thus determined is shown in Table 4.

TABLE 4

| Dye No. | Proportion of Li to total M in dye as determined (mole %) |
|---|---|
| 6 | 90 |
| 7 | 60 |
| 8 | 55 |
| 9 | 50 |
| 10 | 40 |
| 11 | 30 |

The individual dyes of Table 4 were added to a liquid medium having the following composition such that the concentrations of the dyes in the individual liquid medium becomes 3% by weight, and the dyes were thoroughly mixed to form the solutions. The individual solutions were filtered through a Teflon filter having the pore size of 1 μm under pressure and deareated by a vacuum pump to prepare recording liquids.

Liquid medium composition
Deionized water (which will be hereinafter referred to merely as "water": 60 parts by weight
Diethyleneglycol: 40 parts by weight The thus obtained 5 kinds of the recording liquids were subjected to the same tests ($T_1$) to ($T_6$) as in Example 1. The evaluation results are shown in Table 5.

TABLE 5

| | Dye No. | $T_1$ | $T_2$ | $T_3$ | $T_4$ | $T_5$ | $T_6$ |
|---|---|---|---|---|---|---|---|
| Example 21 | 6 | o | o | ⊚ | o | o | o |
| Example 22 | 7 | o | o | ⊚ | o | o | o |
| Example 23 | 8 | o | o | ⊚ | o | o | o |
| Comp. Ex. | 9 | x | Δ | o | Δ | o | o |
| Comp. Ex. | 10 | x | x | x | x | o | o |
| Comp. Ex. | 11 | x | x | x | x | o | o |

EXAMPLES 26-30

Dyes Nos. 12-17 with various proportions of K to total M of the dye structure represented by the general formula (A) were prepared in the same manner as in Examples 21 to 25, and subjected to the same tests ($T_1$) to ($T_6$) as in Example 1. The evaluation results are shown in Table 6.

TABLE 6

| | Dye No. | $T_1$ | $T_2$ | $T_3$ | $T_4$ | $T_5$ | $T_6$ |
|---|---|---|---|---|---|---|---|
| Example 24 | 12 | o | o | ⊚ | o | o | o |
| Example 25 | 13 | o | o | ⊚ | o | o | o |
| Example 26 | 14 | o | o | ⊚ | o | o | o |
| Comp. Ex. | 15 | x | Δ | x | o | o | o |
| Comp. Ex. | 16 | x | x | x | x | o | o |
| Comp. Ex. | 17 | x | x | x | x | o | o |

Proportions of K to total M in the dye structure as determined are shown in Table 7.

TABLE 7

| Dye No. | Proportion of K in total M in dye, as determined (% by mole) |
|---|---|
| 12 | 90 |
| 13 | 60 |
| 14 | 55 |
| 15 | 50 |
| 16 | 40 |

TABLE 7-continued

| Dye No. | Proportion of K in total M in dye, as determined (% by mole) |
|---|---|
| 17 | 30 |

EXAMPLES 31-34

The individual recording liquids prepared in Examples 21 and 22 or in Examples 24 and 25 were filled in felt pens, and letters were written on middle class paper (Shiro botan, made by Honshu Seishi Co., Ltd.) with these felt pens to investigate the water resistance of recorded letters and writing property of felt pens after being left unused for 24 hours with their caps off.

In the recording liquids used in the present Examples, all the recorded letters had a good water resistance and had a good recording property, since no deposition of dye, etc. was observed at the pen edges even after being left unused for 24 hours.

We claim:
1. A recording liquid comprising:
    a recording agent as an image-forming component; and
    a liquid medium containing at least water and a glycol for dissolving or dispersing the recording agent, characterized in that the recording agent contains at least one dye represented by the following general formula (A):

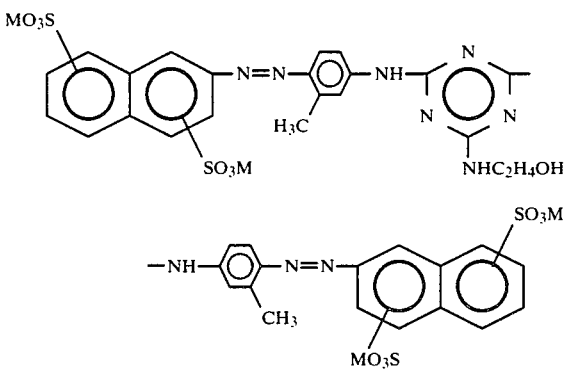

wherein M represents one element selected from H, Na, Li and K, and at least 55 mole % of total M in formula (A) is Na, Li or K and wherein the recording liquid contains less than 1% by weight of NaCl, less than 0.5% by weight of $Na_2SO_4$ and less than 50 ppm of $Ca^{2+}$ ions.

2. A recording liquid according to claim 1, wherein the liquid medium contains 80% or less by weight of water on the basis of the liquid medium.

3. A recording liquid according to claim 1 wherein glycol contained in the liquid medium is at least one member selected from the group consisting of: polyalkyleneglycols; alkyleneglycols whose alkylene group has 2-6 carbon atoms; and lower alkyl ethers of polyhydric alcohols.

4. A recording liquid according to claim 1, wherein the content of the glycols in the recording liquid is 10 to 70% by weight on the basis of total weight of the recording liquid.

5. A recording liquid comprising:
    a recording agent as an image-forming component; and a liquid medium containing at least water, a glycol and a water-soluble organic solvent for dissolving or dispersing the recording agent, characterized in that the recording agent contains at least one dye represented by the following formula (A):

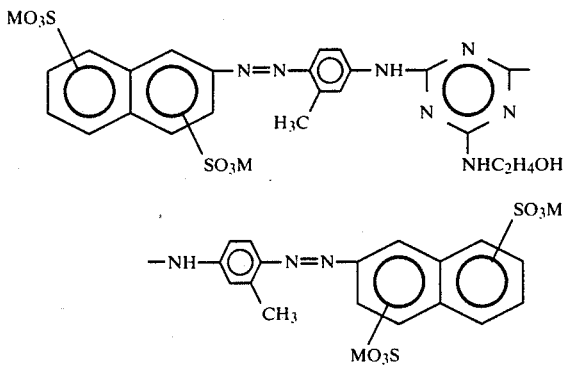

wherein M represents one element selected from H, Na, Li and K, and at least 55 mole % of total M in formula (A) is Na, Li or K and wherein the recording liquid contains less than 1% by weight of NaCl, less than 0.5% by weight of $Na_2SO_4$ and less than 50 ppm of $Ca^{2+}$ ions.

6. A recording liquid according to claim 5, wherein the water-soluble organic solvent contained in the liquid medium component is at least one member selected from the group consisting of: alkyl alcohols having 1 to 4 carbon atoms; amides; ketones; ketone alcohols; ethers; and nitrogen-containing heterocyclic ketones.

7. A recording liquid according to claim 5, wherein the content of the water-soluble organic solvent and the glycol in the recording liquid is 10–70% by weight on the basis of total weight of the recording liquid.

8. A recording liquid according to claim 5, wherein the content of the water is 30 to 90% by weight on the basis of total weight of the recording liquid.

9. A recording liquid according to claim 2, wherein the liquid medium is substantially free of $Cl^-$, $SO_4^{2-}$ or $Ca^{2+}$ inorganic components.

10. A recording liquid according to claim 3, wherein the liquid medium is substantially free of $Cl^-$, $SO_4^{2-}$ or $Ca^{2+}$ inorganic components.

11. A recording liquid according to claim 4, wherein the liquid medium is substantially free of $Cl^-$, $SO_4^{2-}$ or $Ca^{2+}$ inorganic components.

12. A recording liquid according to claim 6, wherein the liquid medium is substantially free of $Cl^-$, $SO_4^{2-}$ or $Ca^{2+}$ inorganic components.

13. A recording liquid according to claim 7, wherein the liquid medium is substantially free of $Cl^-$, $SO_4^{2-}$ or $Ca^{2+}$ inorganic components.

14. A recording liquid according to claim 8, wherein the liquid medium is substantially free of $Cl^-$, $SO_4^{2-}$ or $Ca^{2-}$ inorganic components.

* * * * *

UNITED STATES PATENT AND TRADEMARK OFFICE
CERTIFICATE OF CORRECTION

PATENT NO. : 4,661,158
DATED : April 28, 1987
INVENTOR(S) : MASATSUNE KOBAYASHI, ET AL.

It is certified that error appears in the above-identified patent and that said Letters Patent is hereby corrected as shown below:

COLUMN 2

Line 61, "$\overset{|}{S}O_3NA$" should read $--\overset{|}{S}O_3NA \quad (B)--$.

COLUMN 5

Line 1, "dioxiane," should read --dioxane,--.

COLUMN 8

Line 20, "property" should read --property:--.
Line 44, "voltage" should read --orifice--.

COLUMN 14

Line 29, "$Ca^{2-}$" should read --$Ca^{2+}$--.

Signed and Sealed this

First Day of September, 1987

Attest:

DONALD J. QUIGG

*Attesting Officer*     *Commissioner of Patents and Trademarks*